(No Model.) 9 Sheets—Sheet 1.
O. R. CHAPLIN.
MACHINERY FOR MANUFACTURING BOTTLING WIRE.
No. 261,907. Patented Aug. 1, 1882.

Fig. 1

Witnesses.
Wm. A. Copeland.
J. H. Baker.

Inventor.
Orvel R. Chaplin
by Wm. A. Macleod
Atty.

(No Model.) 9 Sheets—Sheet 3.
O. R. CHAPLIN.
MACHINERY FOR MANUFACTURING BOTTLING WIRE.
No. 261,907. Patented Aug. 1, 1882.

Fig. 3

Witnesses.
Wm. A. Copeland
J. H. Baker.

Inventor.
Orvil R. Chaplin
by Wm. A. Macleod
Atty (No Model.) 9 Sheets—Sheet 4.

O. R. CHAPLIN.
MACHINERY FOR MANUFACTURING BOTTLING WIRE.

No. 261,907. Patented Aug. 1, 1882.

Witnesses.
Wm. A. Copeland
J. H. Baker

Inventor
Orril R. Chaplin
by Wm. A. Macleod
atty

N. PETERS, Photo-Lithographer, Washington, D. C.

(No Model.) 9 Sheets—Sheet 9.

O. R. CHAPLIN.
MACHINERY FOR MANUFACTURING BOTTLING WIRE.

No. 261,907. Patented Aug. 1, 1882.

Witnesses.
Wm. A. Copeland.
J. H. Baker.

Inventor.
Orvil R. Chaplin
by Wm. A. Macleod
Atty

UNITED STATES PATENT OFFICE.

ORRIL R. CHAPLIN, OF BOSTON, MASS., ASSIGNOR OF TWO-THIRDS TO DANIEL C. KNOWLTON AND WILLIAM A. MACLEOD, BOTH OF SAME PLACE.

MACHINERY FOR MANUFACTURING BOTTLING-WIRES.

SPECIFICATION forming part of Letters Patent No. 261,907, dated August 1, 1882.

Application filed December 21, 1881. (No model.)

*To all whom it may concern:*

Be it known that I, ORRIL R. CHAPLIN, of Boston, in the county of Suffolk and State of Massachusetts, have invented a new and useful improvement in machinery for cutting, looping, and twisting the pieces of wire which are used in securing the corks or stoppers in bottles and other like vessels, of which the following is a full, clear, concise, and exact description, reference being had to the accompanying drawings, forming a part hereof, in which—

Figure 18:
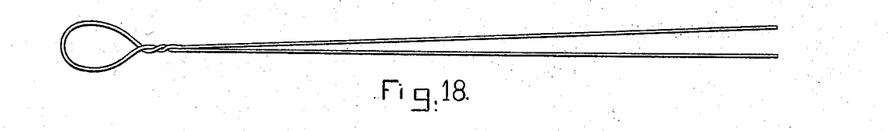
Figs. 18 and 19 are views of different styles of the bottling-wires which are looped and twisted by the machines.
Figure 19:
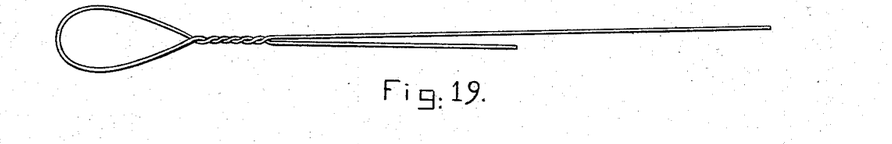

The process of securing the stoppers in bottles and other vessels which contain aerated waters, sparkling wines, and other liquids of this class, by means of a piece of wire, (like that shown in Fig. 18 or 19,) which is made to embrace the neck or other part of the bottle or vessel and then brought up over the top of the stopper and secured, is well known. The pieces of wire so used are first cut into the required length, then bent to form a loop near the middle, then close to the loop the wire is several times twisted upon itself, and the ends of the piece of wire left to project free from the twisted portion. The piece so prepared is then ready to be applied to the bottle or vessel.

My machine, more fully described below, operates to take the continuous wire from a reel, cut it to the required lengths, form the loop, twist the wire upon itself, and deposit the wires so cut, looped, and twisted in a holder in bundles of any given number, ready to be tied up by the operator and packed for future use or transportation.

My machine is constructed as follows, and combines mechanism for performing five distinct operations, viz: first, feeding a given length of wire from the reel into the conductor; second, cutting off the length so fed in; third, seizing the length at the middle and forming the loop; fourth, twisting the wire to form the twisted portion; fifth, seizing the looped and twisted piece and carrying and depositing it in the bundling-rack.

I will describe the various parts of the complete mechanism in the order named, using letters of reference to the accompanying drawings.

A represents a reel or spool of any convenient form for holding the coil of wire, which is placed in convenient proximity to the feeding-rollers, which feed the length of wire forward.

The lower feed-roll, B, is provided with a toothed periphery, the teeth, however, not extending across the width of the periphery, but leaving a portion of it plain. The toothed portion meshes with the toothed portion of the periphery of the upper feed-roll, C. The lower feed-roll, B, is also fitted on the plain part of its periphery with a ring or band, $b$, preferably of steel or hard metal, which as the rolls revolve works in a corresponding groove, $c$, in the plain part of the periphery of the upper feed-roll, C. The wire, as it is fed forward, lies in this groove $c$, and is nipped between the bottom of the groove and the periphery of the hard ring $b$. The upper feed-roll, C, being set on a spindle, $c'$, which is set into a movable arm, $c''$, which, being pressed down by spring $c'''$, the lower end of which bears against a pin set in the upright support F, allows the rolls B and C to vary slightly their relative positions to each other, and thus accommodate varying sizes of wire without continued readjustment by the operator. The length of wire fed forward is dependent upon the number of revolutions of the lower feed-roll, the upper feed-roll being actuated by the lower one.

Motion is communicated to the lower feed-roll, B, by the action of the intermittent gear D, which is fast to shaft E, the teeth on this intermittent gear meshing with the cogged hub B' of the lower feed-roll, B, said hub being fast with the lower feed-roll. It will be plain, therefore, that the number of revolutions of the lower feed-roll made (and consequently the length of wire fed forward) at each revolution of the intermittent gear will depend upon the length of the toothed or cogged portion of the intermittent gear, and that the length of wire may be regulated by increasing or diminishing the length of said toothed portion. In order to effect this I make said intermittent gear double—that is, I construct two gears, each having an equal number of cogs, and place them together on the shaft and clamp them fast in any convenient manner. The gears shown are clamped by means of a threaded pin fast to the face of the inside gear, and which operates in a slot cut in the outside gear. A thumb-screw, $b^2$, working in the threaded pin may be screwed tightly against the free face of the outside gear, thus holding the gears securely together in any given position. When, therefore, the cogged portions of said gears are directly opposite each other, the cogged portion of this compound gear is the shortest, and the shortest length of wire will be fed forward at each revolution. If, however, it is desirable to increase the length of wire, the thumb-screw $b^2$ is loosened and the gears slipped upon each other to lengthen the cogged portion of the compound gear, thus causing a greater number of cogs to bear upon the cogged hub B', and consequently causing a greater number of revolutions of the lower feed-roll, B, and therefore feeding a greater length of wire forward.

To insure against any backward or uncertain motion of the feed-roll B, I attach the pawl or clutch $b^3$, journaled at $b^4$, to the frame F, and provided with a single spur or tooth, $b^5$, and arranged to be thrown against the cogged hub B' and held there during the times that it is desirable to hold the feed-roll B in a fixed stationary position. This pawl is controlled in its movements by the spiral spring $b^6$, fast at one end to the pawl and at the other end to the end of the conductor G, which acts to draw it against the cogged hub B', and by the rider $b^7$, which is placed on the face of the intermittent gear D, and which at each revolution of the gear travels under the free end of the pawl, throwing the pawl back and freeing it from the cogged hub B'. It will be plain that this rider may be so arranged on the face of the gear with relation to the cogged portion of its periphery that as soon as the cogged portion of the periphery has passed the cogged hub B' the rider will have passed the free end of the pawl, thus allowing the spiral spring to act and throw the pawl against the hub, holding the feed-wheel securely in a fixed stationary position, and rendering it certain that the feeding mechanism can act only in a regular and certain manner.

Figures 4, 5, 6, 7:
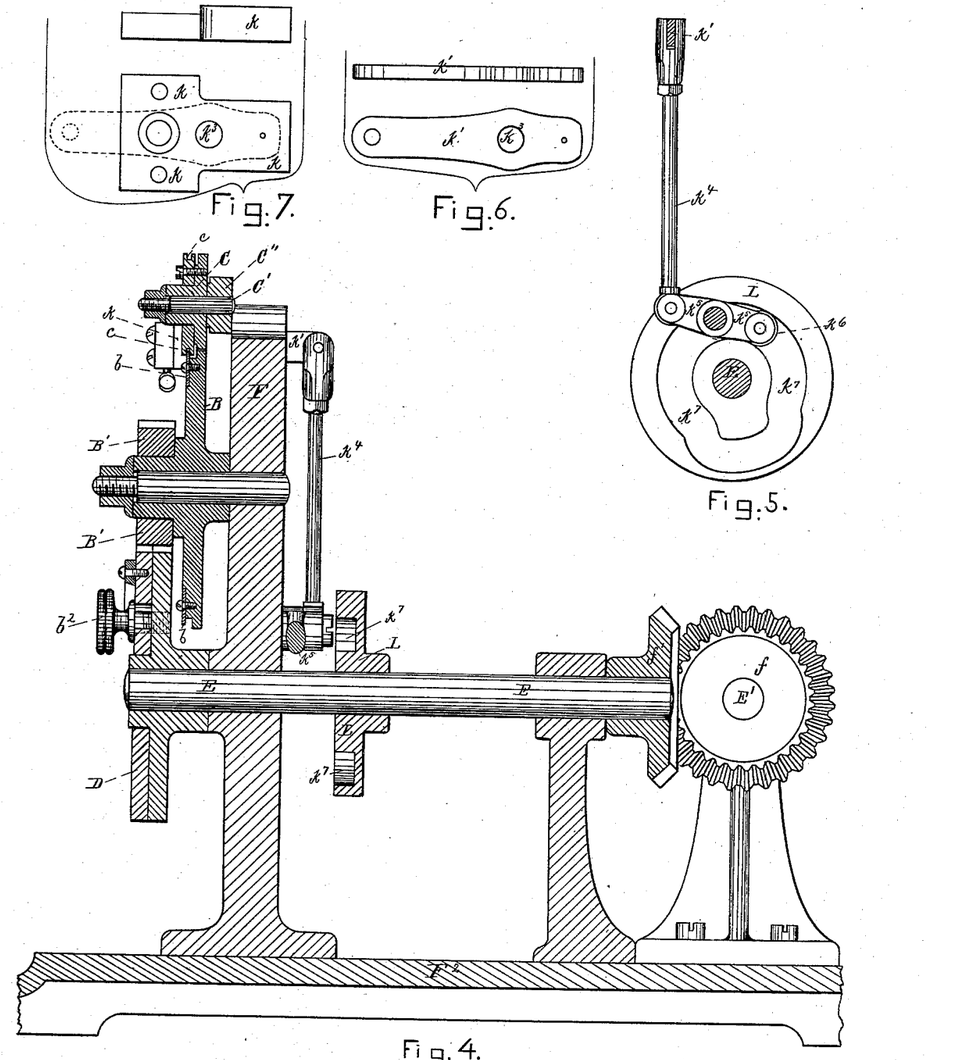
Fig. 4 is a vertical section on lines $x\ x$, Figs. 1, 2, and 3, showing the feed-rolls and their actuating mechanism.
Fig. 5 is a detail, showing the cam which actuates the knife, together with its lever and connecting-rod.
Fig. 6 is a detail of the movable cutter.
Fig. 7 is a detail of the stationary cutter, showing in dotted lines the movable cutter in position.

The pin $b^{10}$ is fast to frame F, and is provided with a hole, through which the wire passes before going between the feed-rolls. This insures the straight passage of the wire between the roll. The wire passes from the feeding-rolls through the cutting-holes $x^{20}$ $x^{20}$ (see Figs. 6 and 7) in the cutters $k$ $k'$ (the cutter $k$ being stationary and $k'$ being movable) into the tube-shaped conductor G, which conducts the wire to the mouth $G^2$, the conductor G being arranged with a lid, G', held down by the pressure of spring $a$ and supported at one end by the stationary cutter $k$, fast to the frame F, and at the other by the upright F', rising from the bed-plate $F^2$. The lid G' extends the whole length of the conductor, and is held closed by pressure of spring $a$ when the wire is being fed forward into the conductor. When so closed it forms a tube, through which the wire is allowed to pass as the rolls feed it forward. $G^2$ is a mouth, cast solid with the conductor at its free end, and into which the beak $d$ of the looping-clamps $d^2$ $d^2$ is thrust to seize the wire. If, therefore, it is desired to form the loop in the middle of the length, the wire is fed forward so that one-half of the length to be cut off is projecting beyond the mouth $G^2$—that is, the middle of the length of wire lies across the mouth $G^2$, one half of the wire projecting free beyond the conductor, while the other half lies in the tube $d^3$ of the conductor. As soon, now, as the looping-clamps (more fully described below) descend into the mouth $G^2$ and seize the middle of the wire the lid G' is lifted against the pressure of spring $a$ by the free end of the movable lever-cutter $k'$, which acts under and against a lug on the end of the lid. At the same movement the cutter severs the length of wire, and directly the looping-clamps $d^2$ $d^2$, (which may of course be made with clamping parts of greater or less size, according to the size of loop required,) which have seized the middle of the wire, ascend and carry the length of wire back with them into position to be looped or twisted, the opening of lid G' allowing the half of the length of wire which lies in the tube of the conductor to be drawn out by the looping and twisting mechanism and carried back, as described.

The stationary cutter $k$ is secured to frame F, and the movable lever-cutter $k'$ is pivoted at its fulcrum $k^3$ to the stationary cutter. The end of the lever-cutter is jointed to a connecting-rod, $k^4$, which is jointed at its lower end to the cam-lever $k^5$, said cam-lever being pivoted at its middle to the frame F, and bearing on one end a cam-truck, $k^6$, which acts in the cam-path $k^7$ of the cam L, which is fast to shaft E, the cam-path $k^7$ being arranged, as shown, so that at every revolution of shaft E it acts through the lever $k^5$ and connecting-rod $k^4$ so as to tilt the movable cutter $k'$, thus raising lid G', and at the same time cutting off the length of wire.

Figures 11, 13, 14:
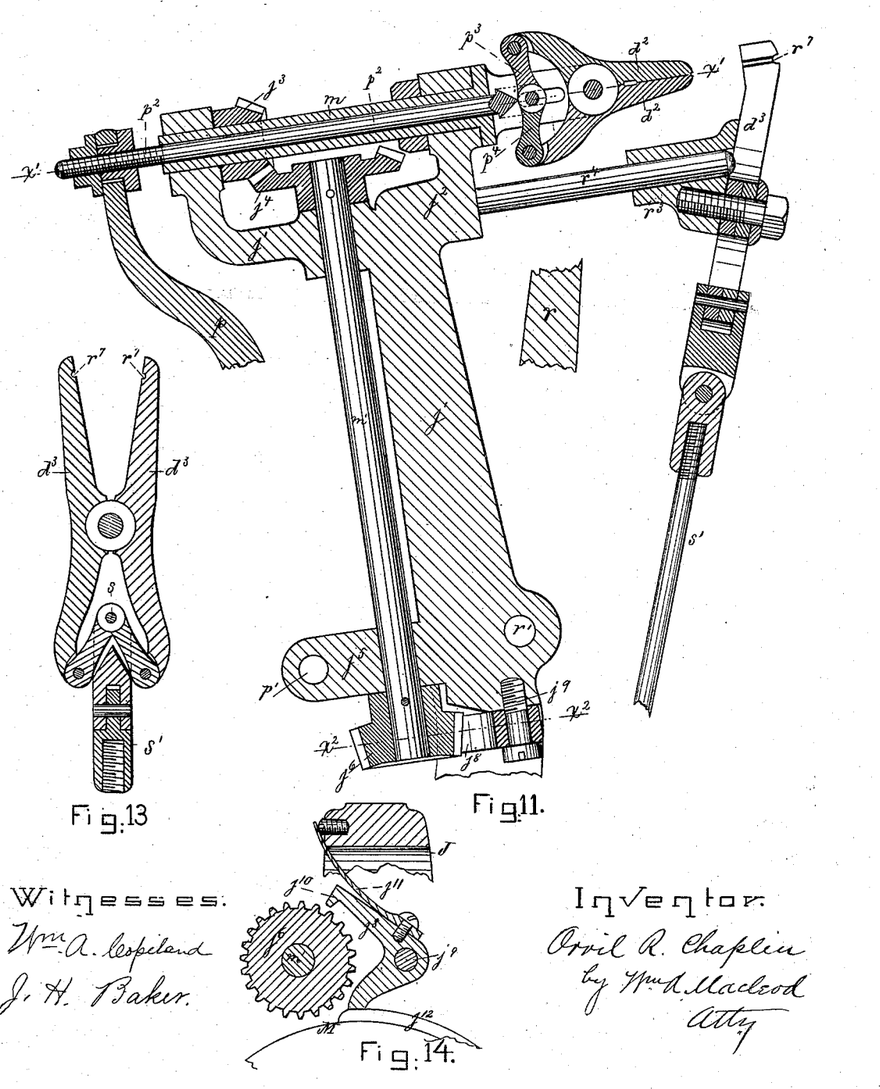
Fig. 11 is a vertical section through the upper part of the reciprocating frame and the mechanism which it supports, showing the shafts and gears which operate to revolve the twisting-clamps, also the upper part of the lever and connecting-rod which operate through the toggles to open and close the twisting-clamps, also showing the spindle which supports the moving head, and a vertical section of the head and attached holding-clamps and part of connecting-rod, the holding-clamp being shown in position to hold the wire while it is being twisted, the sustaining-head being at the outer end of the spindle.
Fig. 13 is a section showing the holding-clamps with their toggles and the upper end of the connecting-rod.
Fig. 14 is a section on line $x^2\ x^2$ of Fig. 11, showing the pawl which acts to prevent any uncertain motion of the gear on the lower end of the upright shaft through which motion is communicated to revolve the twisting-clamps.
Figure 12:
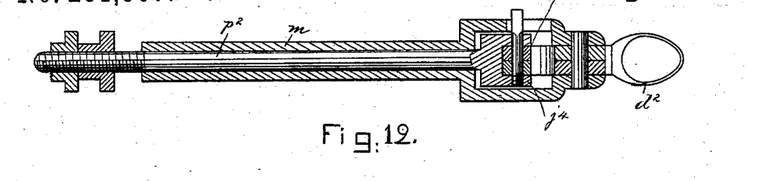
Fig. 12 is a section on line $x'\ x'$ of Fig. 11.
Figure 15:
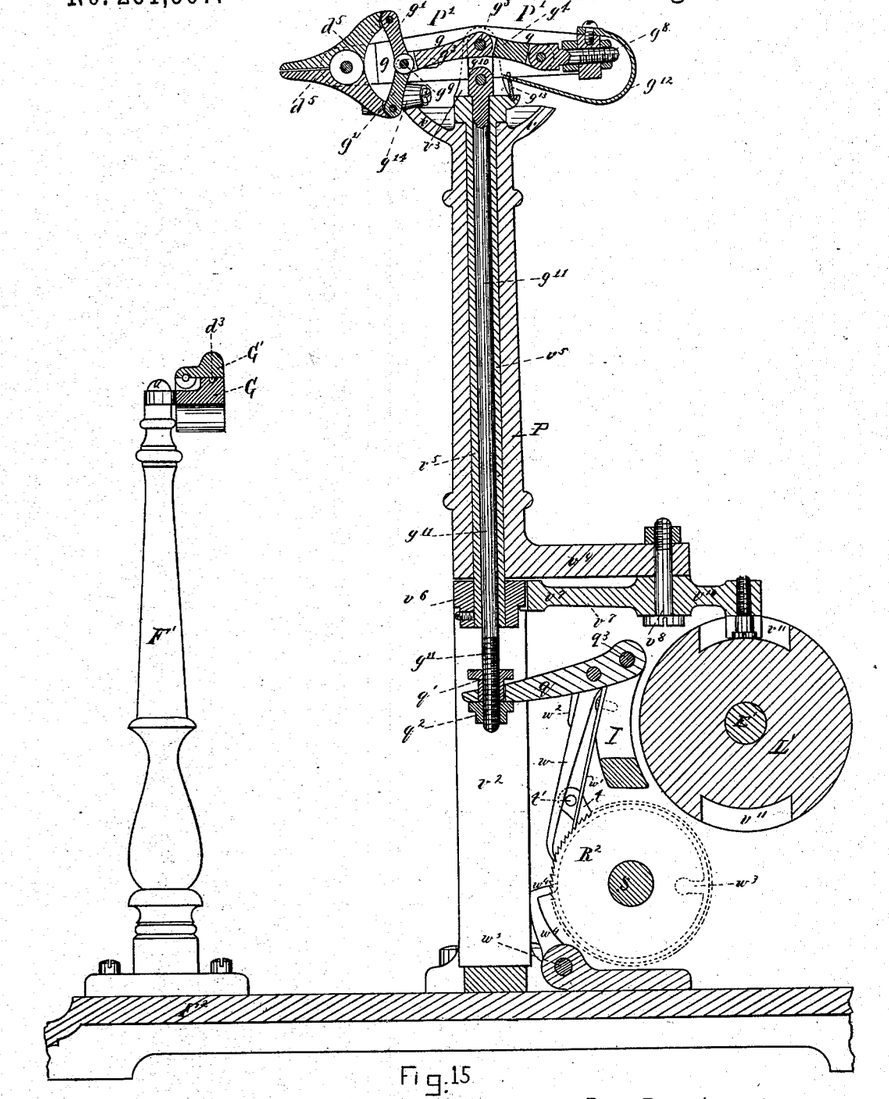
Fig. 15 is a vertical section of the upright frame which supports the semi-rotating head which carries and deposits the wires after they are completed, showing the carrying-head and its actuating mechanism, as also the device for noting the number of wires cut, looped, twisted, and deposited, and showing, also, the bed-plate in section, and at the left of the figure the upright which supports one end of the conductor, together with a vertical section of the conductor.

The looping and twisting mechanism (see Figs. 8 and 11) is mounted upon the main shaft E', which communicates power through bevel-gears $f$ $f'$ to the secondary shaft E, which actuates the feeding and cutting mechanism above described. Said shaft E' is journaled into the two upright $E^2$ $E^3$, which rise from the bed-plate $F^2$, and is connected with the driving-shaft in the boxing H by gear H' on the main shaft and pinion $H^2$ on the driving-shaft, the driving-shaft being journaled in the upright $H^3$, rising from the bed-plate. On the main shaft E' rests the head or frame J, which is of an inverted-Y or yoke shape, and which is journaled on the shaft by boxes $h$, but not fast to it, and projects above said shaft. The single arm $j$ projecting upward from the yoke J is so arranged with relation to the mouth $G^2$, fast to the conductor, that a vertical plane passing centrally through said arm $j$ and at right angles to the axis of upright F' will also pass through the center of mouth $G^2$. This arm $j$ and yoke J are cast solid, and act as a frame for the support of the looping and twisting mechanism and the parts which connect it with the double actuating cam-wheels M and N, set fast on the main shaft E', inside the yoke-shaped frame J. The upright arm $j$ is spread out at its upper end in the two elbowed supports $j'$ $j^2$, arranged to act as a support for the hollow shaft $m$, which is journaled therein. This shaft $m$, by its revolution, twists the wire by revolving the clamping-jaws $d^2$ $d^2$, motion being communicated to the shaft $m$ by the bevel-pinion $j^3$, into which the bevel-gear $j^4$ meshes. This bevel-gear $j^4$ is set on the upper end of the upright shaft $m'$, which is set in a bearing in the elbowed support $j'$, and at its lower end in a support, $j^5$, cast solid with the arm $j$. The lower end of this shaft bears the bevel-pinion $j^6$, which is actuated by the curved rack or segment of a gear, $j^7$, fast on the periphery of the cam-wheel M. It will be plain that the length of this curved rack $j^7$ determines the number of revolutions of the upright shaft $m'$, and consequently, also, of the shaft $m$, and therefore the number of times the piece of wire is twisted upon itself, and the number of said twists may be increased or decreased by lengthening or shortening said rack $j^7$. The toothed pawl $j^8$ is pivoted to the inside of frame J at $j^9$, and is provided with a tooth, $j^{10}$, which, by means of the leaf-spring $j^{11}$, secured to the pawl and bearing against the frame J, is thrown against the bevel-pinion by the action of spring $j^{11}$ whenever the free end of the pawl has passed the rider $j^{12}$ on the periphery of cam-wheel M. This rider is so arranged on the periphery with reference to the cogged segment or rack $j^7$, that as soon as the rack passes the pinion $j^6$ the rider will have passed the free end of the pawl, thus allowing spring $j^{11}$ to press the toothed end of the pawl against the bevel-pinion $j^6$ and hold it stationary, thus preventing any uncertain motion of the pinion and the mechanism actuated by it.

The rock-shaft $n$ is set below the main shaft E', near to the bed-plate $F^2$, and is journaled at one end in the upright $E^3$ and at the other in a block, $E^4$, secured to the bed-plate. To this shaft $n$ the jointed lever $o$ is secured at $o'$, at one end, while the other end of said lever is jointed to link $o^{10}$, which is pivoted through frame J at $o^2$. This lever is provided with a cam-truck at $o^3$, which travels in the cam-path $o^4$ on the face of the cam-wheel M. When, therefore, the cam-wheel is revolved by revolution of the main shaft E', the cam-path is of such a shape (shown in Fig. 8) that it throws the lever $o$ down toward the bed-plate, thus carrying down with it the frame J, (which is journaled loosely on the main shaft,) arm $j$, and all the mechanism supported thereon, and allows the beak of the clamping-jaws $d^2$ $d^2$ to swing forward and down into the mouth $G^2$ and seize the length of wire, and at another part of the revolution of cam-wheel M throws the frame and its supported mechanism back into a vertical position above the main shaft, where it remains while the wire is being twisted and until it is seized and carried away by the carrying mechanism supported on upright P, and more fully described below.

Figure 9:
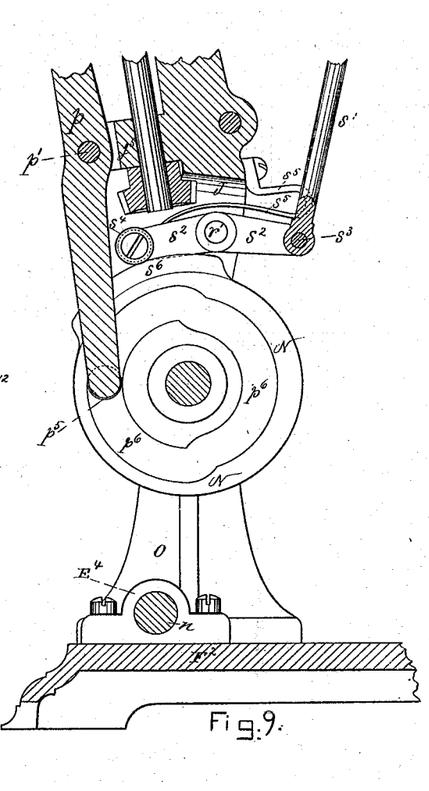
Fig. 9 is a side view of the two cams which actuate the twisting and holding clamps, part of the lever which operates to open and close the twisting-clamps being shown in section, as is also part of the upright shaft through which power is transmitted to revolve the twisting-clamps. The lever and lower end of the connecting-rod, which operate to open and close the holding-clamps, are also shown.

The levers $p$ and $r$ are respectively for actuating the toggles which close the twisting-clamps $d^2$ $d^2$, causing them to seize the wire, and for actuating the toggle which closes the holding-clamps $d^3$ $d^3$, which seize the doubled piece and hold one part of it stationary while the other is being twisted. The lever P is pivoted at $p'$ to the arm $j^5$ on the reciprocating frame $j$, and its upper end is fast to the rod $p^2$, which passes through the hollow shaft $m$, and is pivoted to the toggles $p^3$ $p^4$, which operate the clamping-levers $d^2$ $d^2$, causing them to close as the rod $p^2$ moves away from the clamps and to open as the rod is moved toward the clamps, in a manner well known to those skilled in mechanics. The lower end of said lever $p$ bears the cam-truck $p^5$, which operates in the cam-path $p^6$ (see Fig. 9) on the face of cam-wheel N. It will be plain, therefore, that every revolution of the cam-wheel will throw the upper end of lever $p$ toward and away from frame $j$, thus operating rod $p^2$, and consequently the toggle-clamping device, and causing the clamps $d^2$ $d^2$ to close and open to seize and hold and let go of the wire.

Figure 8:
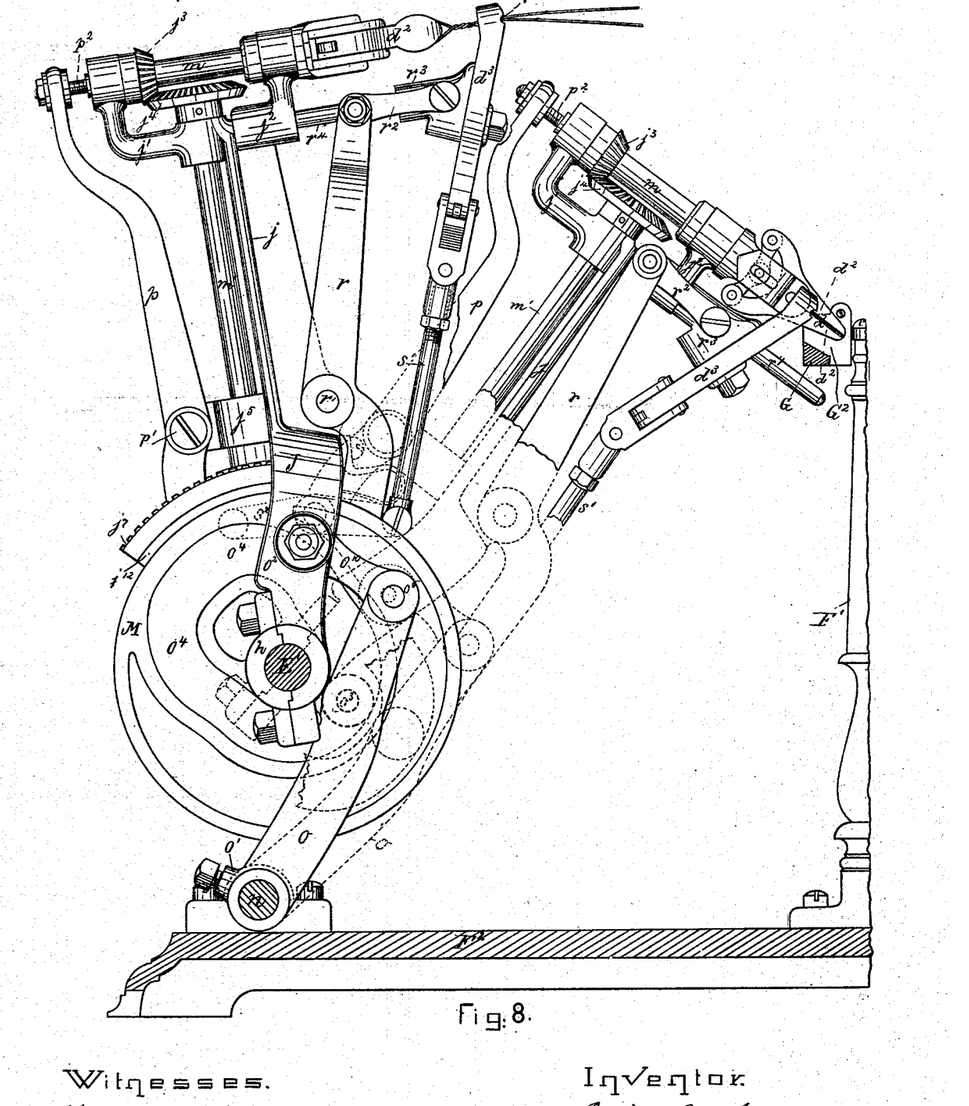
Fig. 8 is a side view of the frame which supports the twisting-clamps, together with the mechanism for operating these clamps, and also showing a section of the bed-plate and part of the upright which supports one end of the conductor, with a section through the mouth at the end of the conductor, also showing the frame in two positions—its position when twisting the wire and also when thrown forward, the clamps having seized the wire in the mouth at the end of the conductor, the lower part of the frame and the mechanism which it supports being shown in the last position in dotted lines.
Figure 10:
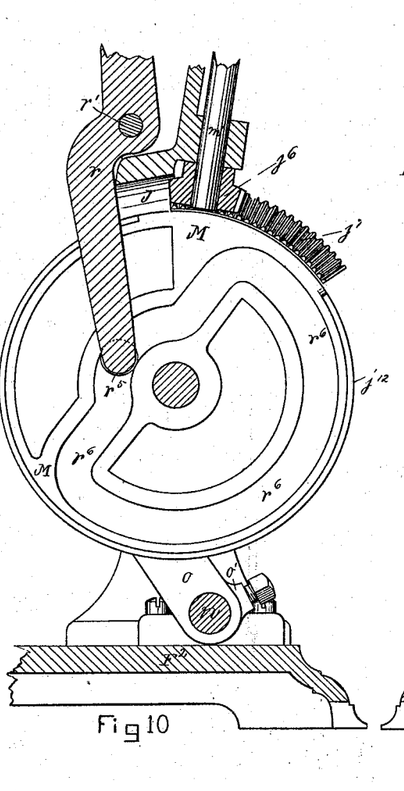
Fig. 10 is a view like the preceding; but showing the cam which operates to throw the head to which the holding-clamps are attached back and forth on its spindle.

The lever $r$ is pivoted at $r'$ to the frame J, and is connected at its upper end by link $r^2$ with the sliding head $r^3$, said link being pivoted at one end to the lever and at the other to the head. The sliding head $r^3$ is arranged to slide on a spindle, $r^4$, which is rigidly set in the elbowed support $j^2$ on the frame. The lower end of lever $r$ is provided with a cam-truck, $r^5$, which operates in the cam-path $r^6$ on the face of cam-wheel M, and is arranged, as shown, (see Fig. 10,) so as to throw the upper end of lever $r$ toward and away from the frame $j$ at each revolution of the cam-wheel. As the upper end of the lever $r$ moves, the connecting-link $r^2$ insures the same relative motion of the sliding head $r^3$ on its spindle. This head acts as a support for the holding-clamps $d^3$ $d^3$, between which one part of the piece of wire is held while the other part is being twisted. It will be clear that the holding-clamps $d^3$ $d^3$ must not be in position directly in front of the twisting-clamps $d^2$ $d^2$ while said twisting-clamps are swung forward into the mouth $G^2$ in the act of seizing the middle of the length of wire, but must allow the twisting-clamps to act freely in seizing the wire. For this purpose I construct the head $r^3$, which holds the holding-clamps in position to slide on the spindle $r^4$, according to the movement of the actuating-lever $r$, and so arrange the toggle device of the holding-clamps $d^3$ $d^3$ (as more fully explained below) that when the clamps are not holding the wire there is no pressure on the toggles, and the clamps are apart and open, in which position the head $r^3$ may be thrown back toward frame $j$, carrying the holding-clamps $d^3$ $d^3$ back with it, and allowing the beak of the twisting-clamps to project between and in front of the holding-clamps, as shown in Fig. 8. The holding-clamps remain in this position while the reciprocating frame J is thrown forward to allow clamps $d^2$ $d^2$ to seize the wire in mouth $G^2$, and while the frame is moving back into its upright position with the length of wire between the clamps $d^2$ $d^2$. As soon as the frame has reached such upright position (see Fig. 8) the sliding head $r^3$ is slid forward, carrying the holding-clamps, which by this forward movement impinge against the wire on either side of the clamps $d^2$ $d^2$, (the holding-clamps being provided with notches or grooves $r^7$, which insure the ends of the wire coming together,) sweeping the ends of the wire around and bringing them together, then closing on them and holding them stationary while the twisting-clamps $d^2$ $d^2$ form the twisted portion.

The holding-clamps $d^3$ $d^3$ are operated by a toggle device, $s$, of well-known construction, substantially like the toggle device which operates the twisting-clamps $d^2$ $d^2$. The connecting-rod $s'$, jointed to the toggles, connects them with the cam-lever $s^2$, being pivoted to said lever at its end $s^3$. The lever $s^2$ is pivoted near its center to the inside of frame J, and the other end bears the cam-truck $s^4$, which is operated by the cam on the periphery of the cam-wheel N. (See Fig. 9.) The leaf-spring $s^5$, secured to the frame J, presses upon the end of the lever $s^2$ near the cam-truck, and holds said cam-truck by a yielding pressure against the cam-shaped periphery. It will be plain, therefore, that at each revolution of the cam-wheel N, as the truck $s^4$ rides the raised portion $s^6$ of the periphery, the end $s^3$ of said lever, to which the connecting-rod $s'$ is pivoted, will be depressed, thus drawing down the connecting-rod, straightening the toggles, and closing the clamping-jaws $d^3$ $d^3$, and as soon as the truck passes said raised portion $s^6$ of the periphery the leaf-spring acts to press the truck down against the plain portion of the periphery, thus raising the end $s^3$ of the lever and throwing up the connecting-rod, thus taking pressure off the toggles and throwing open the clamping-jaws $d^3$ $d^3$.

Figure 1:
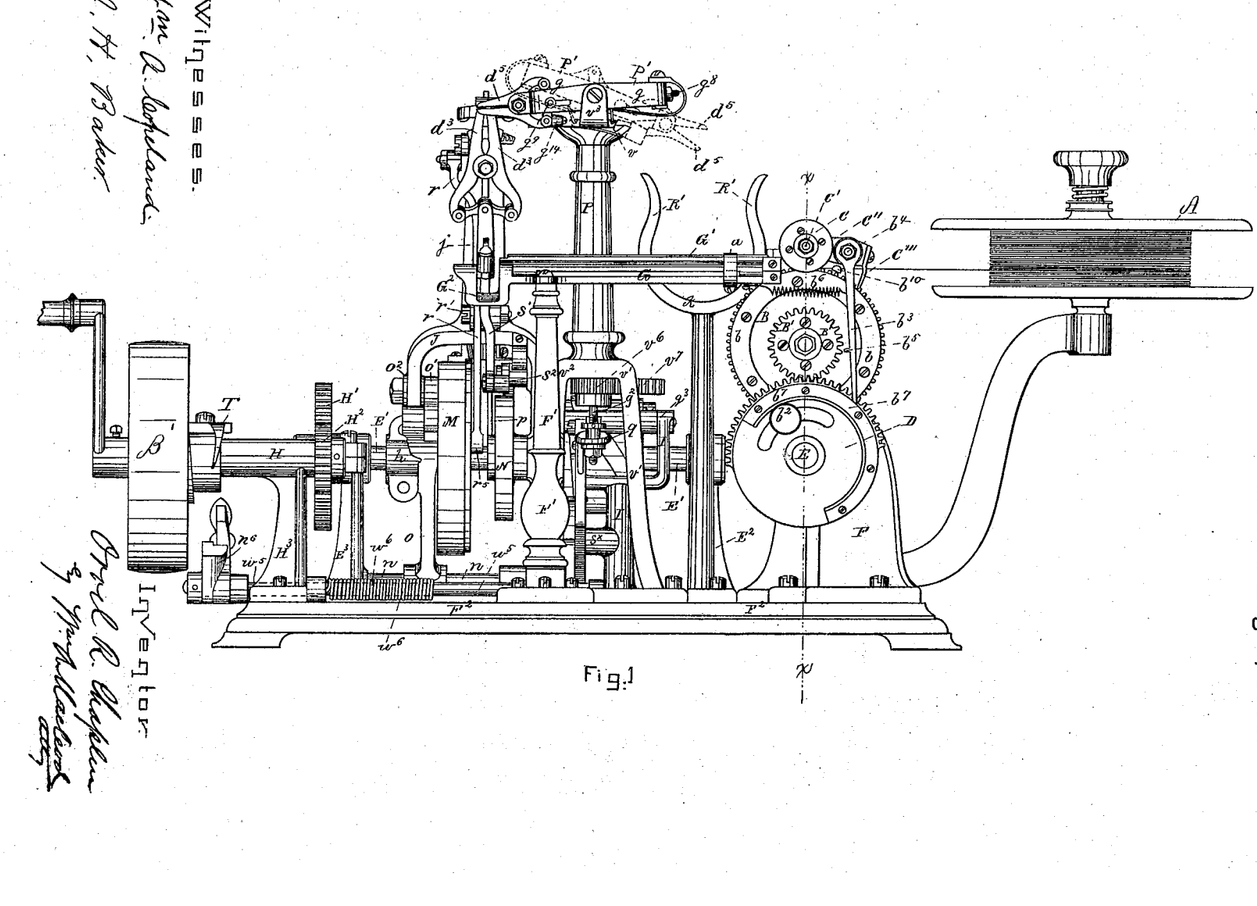
Figure 1 is a front elevation of the machine.
Figure 2:
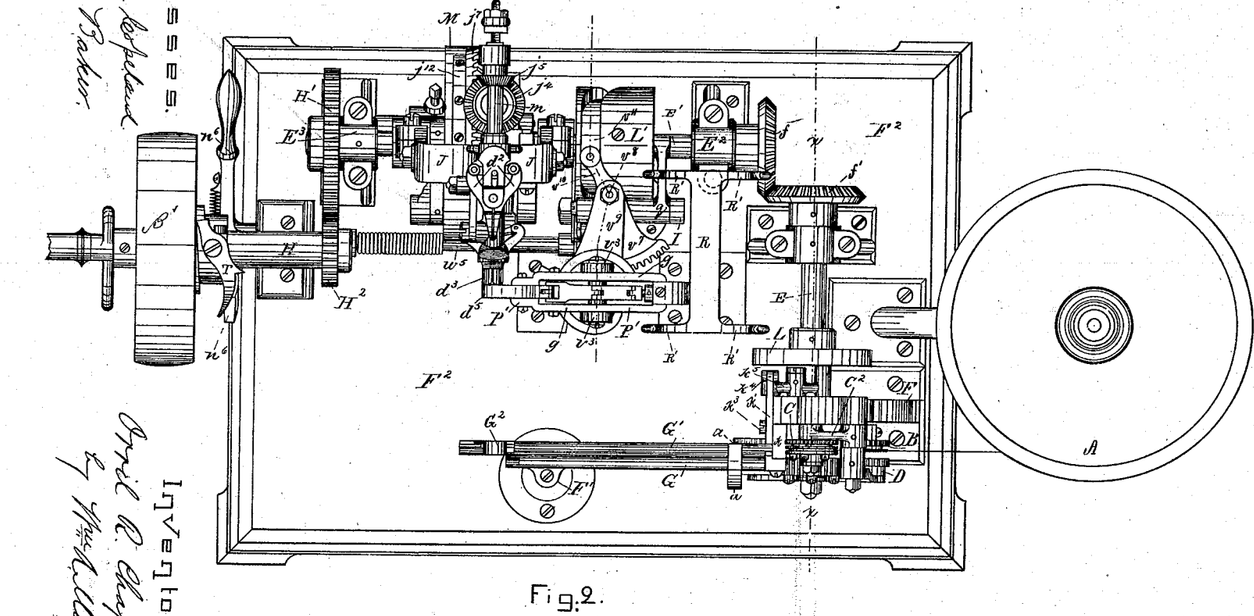
Fig. 2 is a plan.
Figure 3:
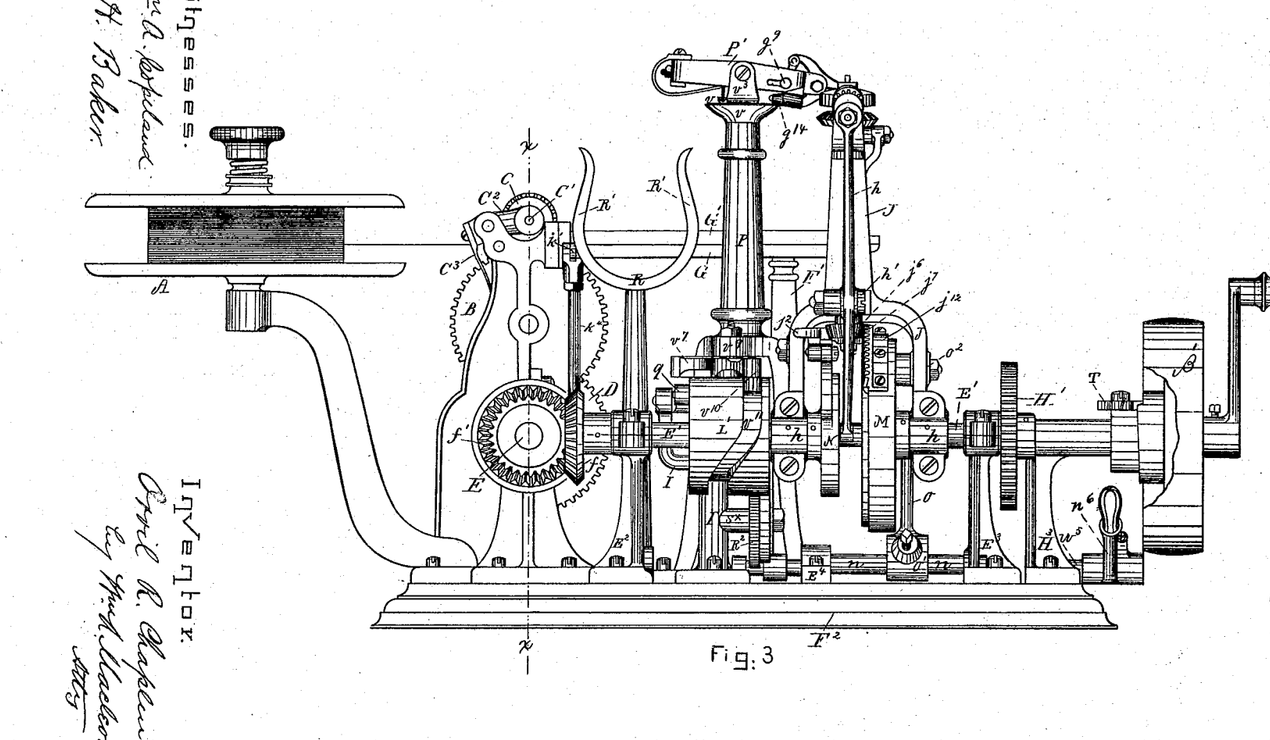
Fig. 3 is a rear elevation.

The upright P rises from the bed-plate and acts as a support for the mechanism which actuates the carrying and depositing head P′. The upper part of said upright consists of a hollow cylinder with a flaring top, $v$, the upper edge of said top $v$ being cut away on one side, forming a cam, the lower part of the upright being divided into two supporting-feet, $v'$ $v^2$. Inside of said upper portion is placed a hollow shaft, $v^5$, bearing at its upper end arms $v^3$ $v^3$, which project above the cam-shaped top. Between these arms the reciprocating semi-rotating head P′ is pivoted. This head consists of a frame, $g$, within which a double toggle device is arranged for the purpose of operating the carrying-clamps $d^5$ $d^5$. The small toggles $g'$ $g'$, which operate directly the clamps, are pivoted to the toggle $g^3$ of a second and larger pair of toggles, $g^3$ $g^4$, which are pivoted to each other at $g^5$, the outer end of toggle-arm $g^4$ being provided with a threaded pin, $g^8$, projecting through the end of the frame $g$, said pin being provided with check-nuts, one inside and the other outside of the frame, by which the toggles may be adjusted and greater or less pressure brought upon the clamps $d^5$ $d^5$. The leaf-spring $g^{12}$ is secured by a screw at the end of the frame, and is bent under said frame and brought to bear upon a link, $g^{13}$, which rests in a groove on a shoulder at the upper end of the shaft $v^5$. The pressure of this spring acts to keep the end of frame $g$, in which the carrying-clamps $d^5$ $d^5$ are pivoted, pressed down upon the cam-shaped edge of the flaring top $v$, over which it rolls on truck $g^{14}$. This insures the dipping of the clamps when they open to drop the wire into the bundling-rack. (See dotted lines, Fig. 1.) The guide-pins $g^9$ on the small toggles act in slots cut in the side of frame $g$, and serve to prevent any tilting of the clamps $d^5$ $d^5$ relatively to frame $g$.

Figures 16, 17:
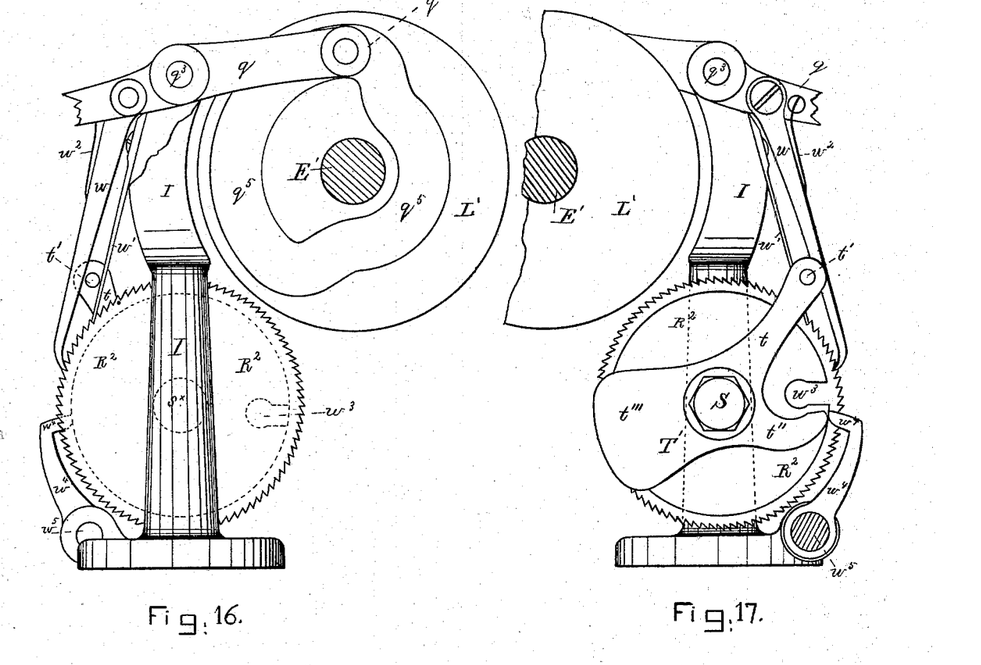
Fig. 16 is a side view of the cam which actuates the clamps of the carrying-head, together with the cam-lever and the support to which it is pivoted, and showing one side of the counting mechanism.
Fig. 17 is a view of the counting device from the side opposite to that shown in Fig. 16.

The link $g^{10}$, pivoted to the joint of the large toggles $g^3$ $g^4$, connects them with the connecting-rod $g^{11}$, which passes through the inside of the hollow shaft $v^5$, and at its lower end passes through the end of lever $q$, and is provided above and below said lever end with the check-nuts $q'$ $q^2$, which give the lever end a bearing in raising and lowering the rod. The lever $q$ is pivoted at $q^3$ between the upper ends of the Y-shaped support I, rising from the bed-plate, and is provided at its other end with the cam-truck $q^4$, which acts in the cam-path $q^5$ in the face of cam-wheel L′, which is arranged as shown in Fig. 16, so that at every revolution of the main shaft the rod $g^{11}$ is raised and lowered, thus opening and closing the clamp-jaws $d^5$ $d^5$. The lower end of the hollow shaft $v^5$ is provided with the spur-gear $v^6$, which meshes into the toothed sector $v^7$. This sector is pivoted at $v^8$ to the under side of the arm $v^9$, projecting from the upright P, and the tail-piece $v^{10}$ of the sector is provided at its end with a cam-truck, which acts in cam-path $v^{11}$ on the periphery of the cam-wheel L′. At each revolution, therefore, of the cam-wheel, as will be plain from the shape of the cam-path $v^{11}$, the toothed sector is thrown past the spur-gear $v^6$, thus semi-rotating the upright hollow shaft $v^5$, and consequently the carrying-head, and the sector in the same revolution of cam-wheel L′ is also thrown back across gear $v^6$, causing semi-rotation of the shaft and carrying-head P′ in the opposite direction, thus causing the carrying-head, after seizing the looped and twisted piece, to swing through a half-circle and deposit the wire in the bundling-rack, and then swing back again for the next piece.

The bundling-rack R may be of any convenient form to receive and retain the wires as they drop from the carrying-clamps $d^5$ $d^5$. The one shown consists of an upright piece rising from the bed-plate, with a horizontal piece extending across its top, springing from which are the four arms R′, within which the pieces fall and are held. A receiver, of sheet-brass or other metal, may be slid between these arms to receive the wires as they are deposited, and as soon as one receiver contains the required number it may be removed for bundling and another substituted in its place, thus keeping the machine constantly in operation. A receiver of this kind is not shown, but only the rack into which it might be placed. The number of wires deposited in the bundling-rack or in the receiver is noted by means of the ratchet-wheel R², which is studded to the arm S$^×$, cast on the upright I. About half the width of the periphery of said ratchet-wheel is covered by the ratchet-teeth, the other portion being plain.

The feed-pawl $w$ is secured at one end to the cam-lever $q$, and is held against the ratchet-wheel by the pressure of spring $w^2$, and as the lever moves downward the feed-pawl turns the ratchet-wheel one tooth forward. The retaining-pawl $w'$, which is a leaf-spring, is fast at one end to an arm of the upright I, and as the ratchet is fed forward by the downward motion of the feed-pawl the retaining-pawl is slipped over the succeeding tooth of the ratchet and prevents any backward motion of it. (See Fig. 16.) It will be plain, therefore, that as a piece of wire is cut, looped, twisted, and deposited for every revolution of the main shaft, and as the lever $q$ has a downward movement once during every revolution of said shaft, and as at each downward movement it carries downward with it the feed-pawl, turning the ratchet forward one tooth, the retaining-pawl is slipped one ratchet-tooth for every piece of wire which is cut, looped, twisted, and deposited. A notch, $w^3$, is cut in the plain portion of the periphery of the ratchet-wheel, into which the pawl $w^4$ drops at every revolution of the ratchet-wheel, and if the ratchet-wheel be provided with one hundred teeth it will therefore revolve once for every hundred revolutions of the main shaft or for every hundred pieces of wire which are cut, looped, twisted, and deposited. The pawl $w^4$ is fast to the horizontal rock-shaft $w^5$, which lies in bearings set on the bed-plate. The spiral spring $w^6$ surrounds the rock-shaft, and is fast at one end to the shaft and at the other to the bed-plate. This spring keeps the pawl $w^4$ pressed against the plain portion of the periphery of the ratchet-wheel, (see Fig. 17,) and throws it into the notch in the periphery whenever during the revolution of the ratchet-wheel the notch comes opposite the tooth of the pawl. As soon as this takes place the shipper-lever $n^6$, attached to the rock-shaft, is thrown forward sufficiently to take with the free end of the clutch-pawl T on the driving shaft, throwing out the clutch, and thereby releasing the pulley, which then turns loosely on the driving-shaft, stopping the machine.

T' is a safety-pawl trip-lever, made of a thin piece of steel-plate, hung loosely on the stud which holds the ratchet-wheel in place and against the free face of the ratchet-wheel. This safety-pawl is constructed with two arms and a balance-piece, the arm $t$ projecting to the right of the stud at the center and upward, and bearing on its end a pin, $t'$, which projects across the inner face of the feed-pawl $w$. If, now, the arm $t$ be pressed down, the pin $t'$ will press against the pawl $w$ and force it back from the ratchet-wheel, and if, while in this position the pawl be moved downward, its end will not take with the ratchet-teeth, but will be entirely free from them, and therefore the ratchet will not be fed forward. The arm $t''$ of the safety-pawl projects to the right of the center stud and downward, and is constructed of the shape shown in Fig. 17. It is so arranged that when the tooth of pawl $w^4$ drops into the notch $w^3$ on the plain portion of the periphery of the ratchet-wheel the under side of the tooth rides the end of arm $t''$, depressing it, and so depressing the arm $t$, thus pressing pin $t'$ against the feed-pawl and throwing it back from the ratchet-wheel, and holding it in that position until the tooth of pawl $w^4$ is raised out of the notch, thus preventing the breaking of any part of the mechanism by attempting to feed the ratchet forward when it is held stationary by the pawl in the notch. The balance-piece $t'''$ projects to the left of the center stud, and serves to give balance to the safety-pawl on its center stud.

To start the machine when power is applied to pulley B, it is only necessary to raise the handle of the shipper-lever $n^6$, thus freeing the lever from the free end of pawl T, thereby allowing the pawl to act and making the pulley fast to the driving-shaft.

The operation of the machine is as follows: The wire passes from the reel through the guide and between the feed-rolls, through the cutters, and into and through the conductor, crossing the mouth. When the required length of wire has been fed forward the feed-rolls cease acting. The twisting-clamps open now, swing forward and down into the mouth, and close on the wire. The cutter now acts to sever the length and to open the lid of the conductor. The twisting-clamps, which have seized the wire, now swing back and up into an upright position, carrying the length of wire with them. The holding-clamps now move forward, their jaws sweeping the ends of the wire together, closing on the ends and holding them stationary, while the twisting-clamps act to twist the wire. While the wire is being twisted the carrying-clamps, which have previously swung into position, seize the wire, and when the twisting and holding clamps have opened the carrying-head semi-rotates, carrying the wire to a position over the bundling rack or receiver. When it has reached this position the carrying-clamps open and the wire falls into the rack. The main and secondary shafts are geared to one another by miter-gears and move at the same speed, and the motions of the parts other than the feeding device are gotten by cams fast to the shafts, and therefore each part completes its motion once at each revolution of the shaft, so that a piece of wire is cut, looped, twisted, and deposited at each revolution of the main shaft.

I claim—

1. The combination, with cogged hub B' and feed-rolls B and C, of the compound intermittent gear D and its actuating-shaft, the gear D, constructed, as shown, to increase or diminish the cogged portion of its periphery and feed forward a greater or less length of wire, as desired.

2. The rod $k^4$, cam $k^7$, and connecting link or lever, in combination with the perforated cutters $k$ $k'$.

3. The conductor G, provided with a hinged lid or cover, in combination with the movable cutter $k'$ and its actuating mechanism, which acts to raise the lid G', and the spring $a$, which exerts pressure on the lid to keep it closed, substantially as described.

4. The conductor G, in combination with the reciprocating frame J $j$, toggle-clamps $d^2$ $d^2$, connecting-rod $p^2$, lever $p$, and cam $p^6$.

5. The seizing and twisting clamps $d^2$ $d^2$ and the toggles, connecting-rod, lever, and cam which operate to open and close the clamps, in combination with shaft $m$, provided with pinion $j^3$, upright shaft $m'$, provided with gears $j^4$ and $j^6$, and the cogged segment on the periphery of cam-wheel M, operating together to cause rotation of the shaft $m$, and consequently of the clamps, and to twist the wire, substantially as described.

6. The combination of the toggle twisting-clamps $d^2$ $d^2$ with the connecting-rod $p^2$, lever $p$, and cam $p^6$, which operate to open and close the clamps, as shown and described.

7. The combination of the toggled twisting-clamps $d^2$ $d^2$, shaft $m$, pinion $j^3$, gear $j^4$, upright shaft $m'$, gear $j^6$, and cogged segment $j^7$, set fast on the periphery of cam-wheel M, which operate to revolve the clamps $d^2$ $d^2$, substantially as described.

8. The toggle-clamps $d^3$ $d^3$, head $r^3$, and spindle $r^4$, in combination with connecting-rod $s'$, connecting-lever $s^2$, and cam $s^6$.

9. The toggle-clamps $d^3$ $d^3$, head $r^3$, and spindle $r^4$, in combination with link $r^2$, rod $r$, and its actuating-cam.

10. The combination of toggle-clamps $d^3$ $d^3$, head $r^3$, spindle $r^4$, connection $s'$, lever $s^2$, cam $s^6$, link $r^2$, rod $r$, and its cam.

11. The clamps $d^2$ $d^2$, toggles $p^3$, connecting-rod $p^2$, lever $p$, and its actuating-cam, in combination with toggled clamps $d^3$ $d^3$, connecting-rod $s'$, lever $s^2$, and its actuating-cam $s^6$, as described.

12. The reciprocating frame $J j$, with its rock-shaft $n$, lever $o$, link $o^{10}$, and cam $o^4$, in combination with seizing and twisting clamps $d^2$ $d^2$ and their toggles $p^3$ $p^4$, connecting-rod $p^2$, and lever $p$, with its actuating-cam, for the purposes specified.

13. The combination of carrying-head $P'$, with the shaft $v^5$ and its gear, and the sector $v^7$ and cam $v^{11}$, which operate to semi-rotate the head, substantially as described.

14. The carrying-head $P'$, in combination with the shaft $v^5$ and mechanism to semi-rotate the head, as shown and described, and the cam-shaped edge $v$, spring $g^{12}$, and link $g^{13}$, which operate to tilt the head, all as set forth.

15. The carrying-clamps $d^5$ $d^5$ and their toggles, in combination with frame $g$, toggle-arms $g^3$ $g^4$, connecting-rod $g^{11}$, lever $q$, and actuating-cam $q^5$, substantially as described.

16. The carrying-head $P'$ and its operating mechanism, as shown and described, in combination with clamps $d^2$, toggles $p^3$ $p^4$, connecting-rod $p^2$, lever $p$, and actuating-cam.

17. In combination with the mechanism for cutting and twisting, as above specified, cam $q^5$, lever $q$, feed-pawl $w$, retaining-pawl $w'$, and ratchet $R^2$.

18. The ratchet-wheel $R^2$, provided with notch $w^3$, and feed-pawl $w$ and its lever and cam, in combination with retaining-pawl $w'$, stop-motion pawl $w^4$, rock-shaft $w^5$, lever $w^6$, and clutch T, for stopping the machine.

19. The safety-pawl trip-lever $T'$, in combination with the ratchet-wheel $R^2$, stop-motion pawl $w^4$, and feed-pawl $w$, to free the feed-pawl from the ratchet whenever the stop-motion pawl is engaged in the notch, substantially as described.

ORRIL R. CHAPLIN.

Witnesses:
WM. A. MACLEOD,
WM. A. COPELAND.